United States Patent [19]

Jansen et al.

[11] 4,262,888

[45] Apr. 21, 1981

[54] ARRANGEMENT FOR THE ABSORPTION OF FORCES

[75] Inventors: Harry Jansen, Moers; Bernd Kerntopf, Tönisvorst, both of Fed. Rep. of Germany

[73] Assignee: Ringfeder GmbH, Krefeld-Uerdingen, Fed. Rep. of Germany

[21] Appl. No.: 44,550

[22] Filed: Jun. 1, 1979

[30] Foreign Application Priority Data

Apr. 5, 1979 [DE] Fed. Rep. of Germany ....... 2918094

[51] Int. Cl.³ .............................................. F16F 3/10
[52] U.S. Cl. ................................................... 267/9 A
[58] Field of Search ................. 267/4, 9 R, 9 A, 9 B, 267/9 C, 22 R, 168

[56] References Cited

U.S. PATENT DOCUMENTS

| 2,146,015 | 2/1939 | Haseltine | 267/9 A |
| 2,389,304 | 11/1945 | Geiger | 267/9 A |
| 2,466,087 | 4/1949 | Endsley | 267/9 B |

*Primary Examiner*—Duane A. Reger
*Attorney, Agent, or Firm*—Michael J. Striker

[57] ABSTRACT

An arrangement for resilient absorption of forces, particularly for an intermediate buffer coupling of rail vehicles, has an elongated housing with an open end and a closed end, a friction element located in the region of the open end of the housing, a resilient element cooperating in series with the friction element and formed as a friction spring having a plurality of inner conical rings and outer conical rings cooperating with one another with interposition of a lubricant, and outer and inner cup-shaped casing members in the housing which are telescopable in one another and closingly accommodate the outer rings and the inner rings of the friction spring, of which the inner cup-shaped member has an outer diameter corresponding to the transverse dimensions of an opening of the open end of the housing, whereas the outer cup-shaped member is separated in a longitudinal direction into a plurality of parts which are tightly held together by holding elements.

13 Claims, 6 Drawing Figures

ARRANGEMENT FOR THE ABSORPTION OF FORCES

BACKGROUND OF THE INVENTION

The present invention relates to an arrangement for resiliently absorbing forces, particularly for intermediate buffer couplings for rail vehicles.

Arrangement of the above-mentioned general type are known in the art. A known arrangement has a housing which is closed at its one end, and a resilient support of element accommodated in the housing. The resilient support cooperates in series with a friction device in the region of an open end of the housing. An opening of the open end of the housing has a diameter which is smaller than the inner diameter of a portion of the housing, in which the resilient support is located.

Spring arrangements provided in conventional draw and buffer arrangements must be constructed so as to perform the stroke in correspondence with especially high energy absorption which is required in connection with increasing weight of the vehicles and careful treatment of transported loads.

One of the known arrangements is disclosed in the German Auslegeschrift No. 1,455,238. The friction device of this arrangement comprises a substantially central wedge-formed member with surrounding friction shoes. The housing of the arrangement is provided at its open end with projections which reduce the cross-section of the opening of the housing. Further projections provided on the wedge-formed member cooperate with the above-mentioned projections of the housing so as to limit outward displacement. When percussive force acts upon the arrangement, the central wedge-formed member displaces into the interior of the housing. This force is split into two components or inclined surfaces of the wedge-formed member and inclined surfaces of the friction shoes, which surfaces form wedge pairs. One of the force components presses the friction shoes inwardly into the housing, whereas the other force component presses the friction shoes outwardly toward strong frictional engagement with respective inner surfaces in the region of the open end of the housing. The cylindrical resilient element counteracts the inward displacement of the friction shoe, with interposition of a plate. The resilient element has a stiffness codetermined for the energy absorption of the friction device. The resilient element in the known construction is composed of interconnected disc springs of rubber or similar elastomeric material, which allows to support the friction device and to return it to its starting position only to the limited extent. At the same time, it is known from experience that such springs have a service life which is smaller than that of the vehicle.

SUMMARY OF THE INVENTION

Accordingly, it is an object of the present invention to provide an arrangement for resilient absorption of forces, which avoids the disadvantages of the prior art.

More particularly, it is an object of the present invention to provide an arrangement which possesses higher energy absorption properties and, at the same time, its friction device more reliably returns to its initial position and its resilient element has a greater service life as compared with those of the known arrangements.

In keeping with these objects and with others which will become apparent hereinafter, one feature of the present invention resides, briefly stated, in that an arrangement for resiliently absorbing forces has a resilient element which is formed as a friction spring composed of a plurality of outer conical members and inner conical members cooperating with one another with interposition of a lubricant, and outer and inner cup-shaped casing members which are telescopable in and sealed relative to one another and closingly accommodate the friction spring, of which cup-shaped members the inner cup-shaped member has a diameter corresponding to the reduced transverse cross-section of an open end of a housing of the arrangement, whereas the outer cup-shaped member is separated into several parts in the longitudinal direction and provided with means for holding these parts together. The outer cup-shaped member abuts against a base plate of the housing.

In accordance with another feature of the present invention, the outer cup-shaped member is composed of two mirror-inverted halves whereby it can be manufactured in an especially simple manner, for example by casting or drop forging.

In accordance with still another feature of the present invention, the means for holding together the parts of the outer cup-shaped member is formed as projections which extend outwardly from these parts and abut against an inner wall of the housing without play. Thereby, centering of both cup-shaped members and thereby of the friction spring accommodated therein is attained. Such projections may be provided on the outer cup-shaped member both on its end portion located adjacent to the base plate, and on its end portion which is spaced from the first-mentioned end portion and overlaps the inner cup-shaped member. In such a construction even in unfavorable operational condition, tight abutment in the contact regions of the parts of the outer cup-shaped member is attained.

In accordance with a further feature of the present invention, the means for holding together of the parts of the cup-shaped member may be formed as spring bands which are curved and located between the outer cup-shaped member and the inner wall of the housing. In such construction the parts of the outer cup-shaped member are held together independently of the construction of the housing, e.g., whether the housing is round or polygonal.

An especially firm connection of the parts of the outer cup-shaped member can be attained when each of the parts of the outer cup-shaped member is provided with a pressing member which has an inclined surface and converges in a direction toward the base plate, and a wedge-formed member is provided on the inner wall of the housing and has an inclined surface which cooperates with the inclined surfaces of the pressing members.

In order to attain high sealing of the outer cup-shaped member in a simple manner, the parts of the outer cup-shaped member may be rubberized in the regions of their contact with one another.

In accordance with a further feature of the present invention, the above-mentioned sealing of the parts of the cup-shaped member as well as simple connection of these parts with one another may be attained by provision of grooves in the contact regions of the parts and insertion of sealing strips in these grooves.

In order to attain a maximum sealing and also easy displacement of both cup-shaped members relative to one another, the inner cup-shaped member and the outer cup-shaped member may interengage one another with interposition of a sliding packing sleeve.

In accordance with still a further feature of the present invention, a bottom of the inner cup-shaped member which forms a support for the friction device has a thickness exceeding the thickness of a cylindrical wall of this cup-shaped member. Such a construction allows to omit a separate plate which is utilized in conventional arrangements for distribution of the pressure of the friction shoes of the friction device, onto the resilient element. Thereby, a space is formed in longitudinal direction of the housing which has an increased length which is advantageous for energy absorption characteristics of the friction spring.

Advantages which are attained by the present invention include the provision of a spring arrangement with a high energy absorption in the sense of improved damping of the forces which act upon the arrangement. This is performed by the friction spring which, on the one hand, forms effective support for the friction device with resulting strong frictional engagement of the friction shoes with the friction surface in the housing and, on the other hand, takes up with its inherent high damping the remaining axial force component which displaces the friction shoes inwardly. Thereby, reliable return of the friction device to its initial position after withdrawal of the percussion force is guaranteed. A further advantage is the longer service life of the arrangement which results also from the provision of cup-shaped casing members protecting the friction spring from dust and moisture. The cup-shaped members also prevent the action of the lubricant of the friction spring onto the friction surfaces of the friction device. As a result of the inventive construction of the cup-shaped members, the friction spring has an especially large diameter which is important for its energy absorption characteristics.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
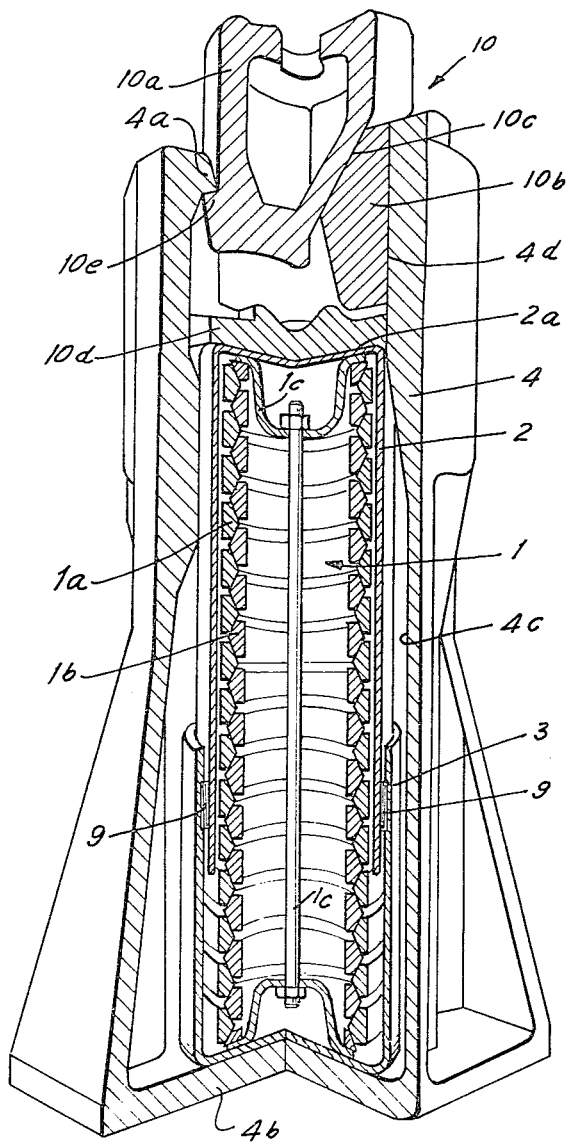
FIG. 1 is a partially sectioned perspective view of a spring arrangement in accordance with the present invention.

An arrangement for resilient absorption of forces shown in FIG. 1 has a housing 4 with a rectangular base plate 4b which is connected with the housing 4 so as to resist to bending. A friction device 10 is arranged in the region of an open end of the housing 4 and includes a central wedge-formed member 10a and totally three friction shoes 10b, each of which is located in the space interjacent the inwardly extending projections 4a of the housing 4. These projections 4a are expecially indicated in FIG. 6. The friction shoes 10b cooperate with the central wedge-formed member 10a through wedge surfaces 10c. On the other hand, the friction shoes 10b abut against friction surfaces 4d of an inner wall 4c of the housing 4 and against a plate 10d. In order to limit the displacement of the friction device 10 toward the open end of the housing 4, the wedge-formed member 10a has outer projections 10e, and the housing 4 has inwardly extending projections 4a which interengage with the projections 10e.

The support of the friction device 10 in the direction toward the interior of the housing is performed by a friction spring 1 located between the plate 10d and the base plate 4b of the housing 4. The spring 1 is composed of double-conical outer rings 1a and double-conical inner rings 1b which cooperate with one another with interposition of lubricant, such as grease, over their conical surfaces. The rings 1a and 1b of the friction spring 1 are held with pre-stress by a clamping arrangement 1c so as to form a self-contained unit.

In order to protect the friction spring 1 from dirt and moisture which can penetrate into the housing 4, and to prevent the action of the lubricant upon the friction surfaces 4d of the housing 4, which can otherwise considerably reduce the energy absorption characteristics of the friction arrangement 10, the friction spring 1 is accommodated in two cup-shaped casing members 2 and 3. The cup-shaped members 2 and 3 telescopically cooperate with one another and are sealed relative to one another with interposition of a sliding packing sleeve 9. The inner cup-shaped member 2 abuts against the plate 10d, and the outer cup-shaped member 3 abuts against the base plate 4b of the housing 4. The bottom 2a may have a sufficient thickness, in which case the separate plate 10d can be omitted. It is also possible to form the inner cup-shaped member 2 as a tube to which a suitable plate 10d is welded.

Figure 6:
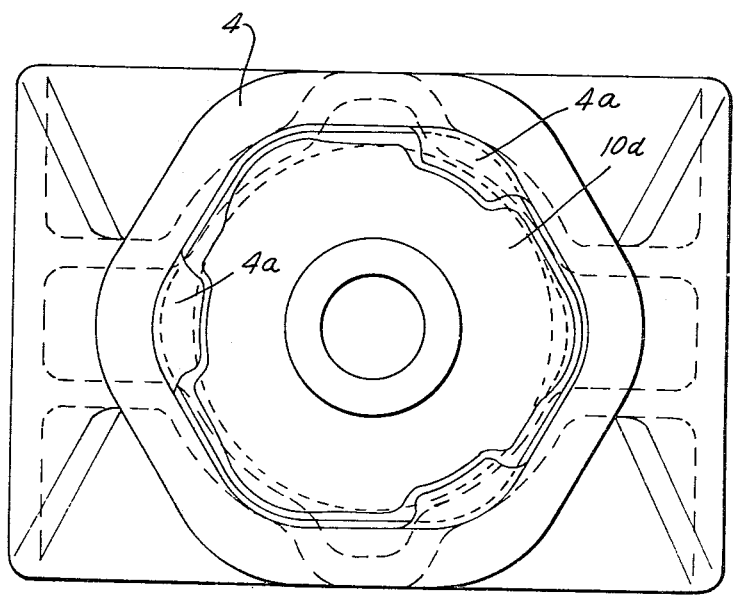
FIG. 6 is a view showing an open end of a housing of the arrangement shown in FIG. 1, in enlarged scale.

As can be seen from FIGS. 1 and 6, the dimensions of the opening which is formed between the projections 4a at the open end of the housing 4 and has a reduced cross-section, are important for the dimensions, particularly the diameter, of parts which are to be inserted into the housing 4. In connection with this and also in order to provide a maximum high energy absorption of the friction spring 1, the outer diameter of the inner cup-shaped member 2 corresponds to the dimension of the opening, so that, with the exception of the small wall thickness of the cup-shaped member, the friction spring 1 has an especially large diameter. The outer cup-shaped member 3 is separated, in the longitudinal direction of the arrangement, into several parts which can be individually inserted into the housing 4 in the region of the projections 4a. Advantageously, the outer cup-shaped member 3 is composed of two mirror-inverted halves.

Figure 2:
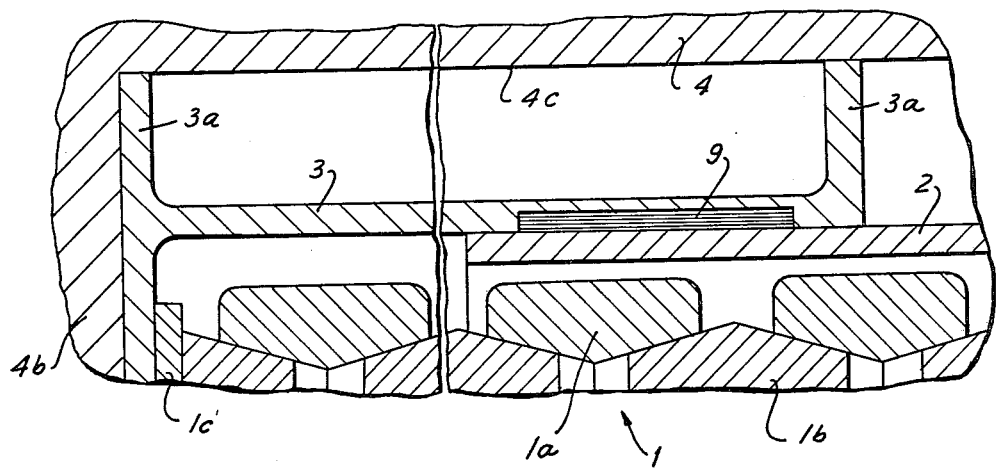
FIGS. 2-4 are views showing a lower region of the arrangement in accordance with further embodiments of the invention, in enlarged scale.
Figure 3:
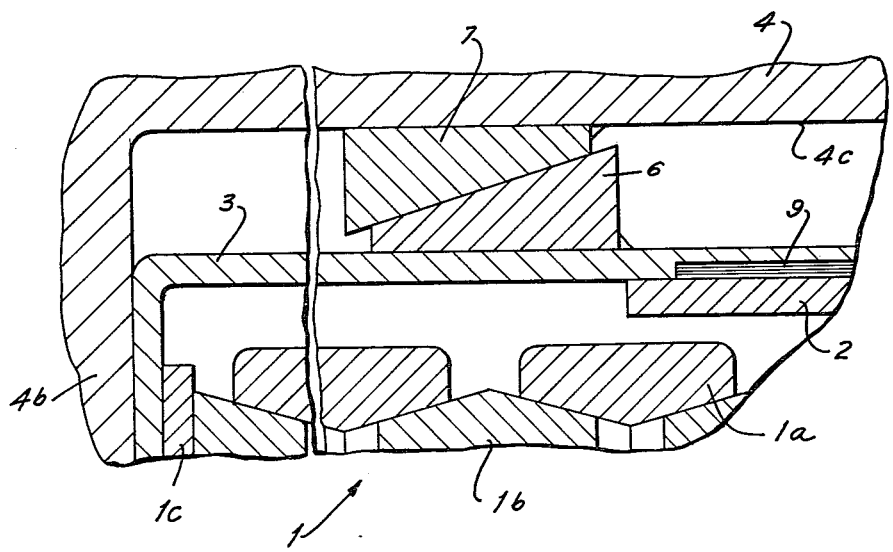
Figure 4:
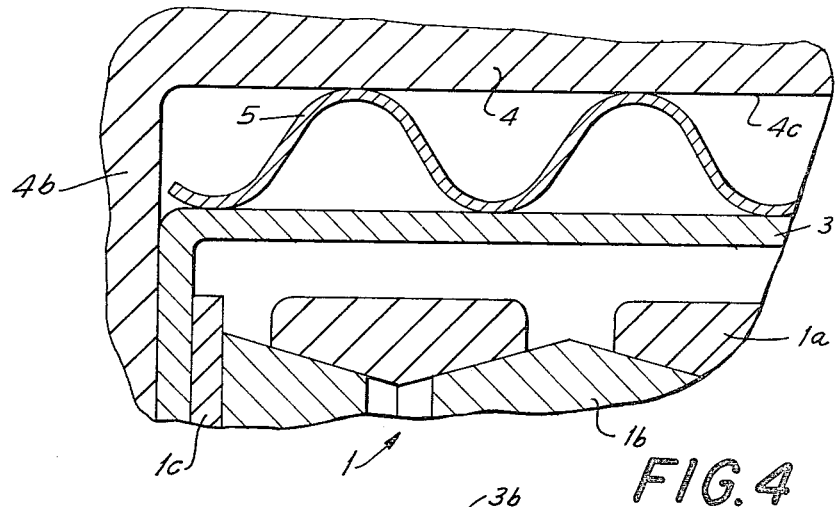

Means are provided for tight connection or holding together of the parts of the outer cup-shaped member 3 which means are shown in FIGS. 2-4. The arrangements which are shown in FIGS. 2-4 have principally the same construction as the arrangement shown in FIG. 1, and therefore parts of these arrangements are identified by the same reference numerals.

In the arrangement shown in FIG. 2, the parts of the outer cup-shaped member 3 are provided with radially outwardly extending projections 3a which abut against the inner wall 4c of the housing without play. In such a construction tight abutment in the regions of contact of the outer cup-shaped member 3 is attained, and centering of both cup-shaped members 2 and 3 and therefore of the friction spring 1 is provided. By this centering the transverse force developed in the case of non-uniform reaction of the friction shoes 10b, can be taken up.

In the arrangement shown in FIG. 3, each part of the outer cup-shaped member 3 is provided on its outer wall with a pressing member 6 which has an inclined surface and converges in a direction toward the base plate 4b of the housing 4. A wedge-formed member 7 having a respectively inclined surface is provided on the inner wall 4c of the housing 4. The inclined surfaces of the pressing member 6 and the wedge-formed member 7 cooperate with one another. It is recommended to perform axial fixing of the pressing members 6, for example by illustrated welding seams, on the parts of the outer cup-shaped member 3 first after the abutment of the pressing member 6 against the wedge-formed member 7. In this case abutment of the parts of the outer cup-shaped member 3 against the base plate 4b of the housing 4 can always take place. In the arrangement shown in FIG. 4, bracing of the outer cup-shaped member 3 is performed by repeatedly curved spring bands 4 which abut against the inner wall 4c of the housing 4. The bands are wave-like and extend in the longitudinal direction of the housing 4. They can also extend in a circumferential direction.

Figure 5:
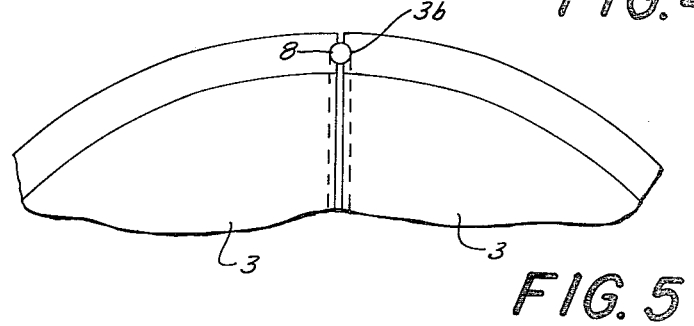
FIG. 5 is a view showing an outer cup-shaped member of the arrangement in the region wherein its parts contact with one another, in enlarged scale.

In the arrangement shown in FIG. 5 a simple possibility is illustrated for sealing of the parts of the outer cup-shaped member 3 in the regions of their contact with one another. Grooves 3b are provided in juxtaposed sections of these parts. The grooves are open toward one another, and a sealing strip 8 is inserted into each pair of grooves.

It will be understood that each of the elements described above, or two or more together, may also form a useful application in other types of constructions differing from the types described above.

While the invention has been illustrated and described as embodied in an arrangement for resilient absorption of forces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for resiliently absorbing forces, particularly for an intermediate buffer coupling of rail vehicles, comprising an elongated housing having two spaced ends and an axis, one of said ends being closed, whereas the other of said ends is open and has an opening; a friction element located in the region of said open end of said housing; a resilient element cooperating in series with said friction element and located in a portion of said housing which is spaced from said open end in a direction of elongation of the latter, said opening of said housing having a transverse dimension which is smaller than the inner transverse dimension of said portion of said housing in which said resilient element is located, said resilient element being formed as a friction spring having a plurality of inner conical rings and a plurality of outer conical rings which cooperate with one another with interposition of a lubricant; outer and inner cup-shaped casing members in said housing and telescopable in one another, said cup-shaped members closably accommodating said friction spring and being sealed relative to one another, said inner cup-shaped member having an outer diameter corresponding to the transverse dimension of said opening at said open end of said housing, said outer cup-shaped member being separated in a longitudinal direction into a plurality of parts which are tightly held together; and means for holding said parts of said outer cup-shaped member together.

2. An arrangement as defined in claim 1 wherein said housing has a base plate, said outer cup-shaped member being supported on said base plate of said housing.

3. An arrangement as defined in claim 1, wherein said plurality of parts includes two mirror-inverted halves which together form said outer cup-shaped member.

4. An arrangement as defined in claim 2, wherein said housing has an inner wall, said outer cup-shaped member having a plurality of projections which extend radially outwardly and abut against said inner wall of said housing without play, said projections forming said holding means.

5. An arrangement as defined in claim 1, wherein said housing has an inner wall, said holding means including a plurality of curved spring bands which are located between said outer cup-shaped member and said inner wall of said housing.

6. An arrangement as defined in claim 5, wherein said spring bands are wave-like and extend in the direction of elongation of said housing.

7. An arrangement as defined in claim 1, wherein said parts of said outer cup-shaped member have regions of contact with one another and are rubberized in said regions.

8. An arrangement as defined in claim 1, wherein said parts of said outer cup-shaped member have regions of contact with one another and are provided with grooves in said regions which grooves are open toward one another; and further comprising a plurality of sealing strips each located in two of said grooves in a respective one of said regions of contact.

9. An arrangement as defined in claim 1, wherein said outer cup-shaped member and said inner cup-shaped member interengage with one another with interposition of a sliding packing sleeve.

10. An arrangement as defined in claim 1, wherein said inner cup-shaped member has a bottom forming a support for said friction element, and a cylindrical wall extending from said bottom, said bottom having a thickness which exceeds that of said cylindrical wall.

11. An arrangement for resiliently absorbing forces, particularly for an intermediate buffer coupling of rail vehicles, comprising an elongated housing having two spaced ends, an inner wall, an axis and a base plate, one of said ends being closed, whereas the other of said ends is open and has an opening; a friction element located in the region of said open end of said housing; a resilient element cooperating in series with said friction element and located in a portion of said housing which is spaced from said open end in a direction of elongation of the latter, said opening of said housing having a transverse dimension which is smaller than the inner transverse dimension of said portion of said housing in which said resilient element is located, said resilient element being formed as a friction spring having a plurality of inner conical rings and a plurality of outer conical rings which cooperate with one another with interposition of a lubricant; outer and inner cup-shaped casing members in said housing and telescopable in one another, said cup-shaped members closably accommodating said friction spring and being sealed relative to one another, said inner cup-shaped member having an outer diameter corresponding to the transverse dimension of said opening at said open end of said housing, said outer cup-shaped member being supported on said base plate of said housing and being separated in a longitudinal direction into a plurality of parts which have an outer surface and are tightly held together; and means for holding said parts of said outer cup-shaped member together, said holding means including a wedge formed member on said inner wall of said housing and having an inclined surface, and a plurality of pressing members each provided on the outer surface of a respective one of said parts of said outer cup-shaped member and having an inclined surface cooperating with said inclined surface of said wedge-formed member.

12. An arrangement as defined in claim 11, wherein said pressing members converge in a direction toward said base plate of said housing.

13. An arrangement for resiliently absorbing forces, particularly for an intermediate buffer coupling of rail vehicles, comprising an elongated housing having two spaced ends, an inner wall, an axis and a base plate, one of said ends being closed, whereas the other of said ends is open and has an opening; a friction element located in the region of said open end of said housing; a resilient element cooperating in series with said friction element and located in a portion of said housing which is spaced from said open end in a direction of elongation of the latter, said opening of said housing having a transverse dimension which is smaller than the inner transverse dimension of said portion of said housing in which said resilient element is located, said resilient element being formed as a friction spring having a plurality of inner conical rings and a plurality of outer conical rings which cooperate with one another with interposition of a lubricant; outer and inner cup-shaped casing members in said housing and telescopable in one another, said cup-shaped members closably accommodating said friction spring and being sealed relative to one another, said inner cup-shaped member having an outer diameter corresponding to the transverse dimension of said opening at said open end of said housing, said outer cup-shaped member being separated in a longitudinal direction into a plurality of parts which are tightly held together, said outer cup-shaped member being supported on said base plate of said housing and having a plurality of projections which extend radially outwardly and abut against said inner wall of said housing without play, said projections forming means for holding said parts of said outer cup-shaped member together, and wherein said outer cup-shaped members and thereby said parts thereof have a first end portion located adjacent to said base plate of said housing, and a second end portion spaced from said first end portion and overlapping said inner cup-shaped member, each of said projections being provided on the first portion of a respective one of said parts; and further comprising a plurality of further projections each provided on the second end portion of a respective one of said parts, said first-mentioned and further projections forming said holding means.

* * * * *